(12) United States Patent
Garnett

(10) Patent No.: US 8,258,638 B1
(45) Date of Patent: Sep. 4, 2012

(54) ENERGY GENERATION USING CONTINENTAL SHELF MASS

(76) Inventor: Donald I. Garnett, Corpus Christi, TX (US)

( * ) Notice: Subject to any disclaimer, the term of this patent is extended or adjusted under 35 U.S.C. 154(b) by 0 days.

(21) Appl. No.: 13/433,707

(22) Filed: Mar. 29, 2012

(51) Int. Cl.
*H02P 9/04* (2006.01)
(52) U.S. Cl. .................................. 290/4 D; 290/1 R
(58) Field of Classification Search ............ 290/1 R, 290/1 A, 1 D, 4 D, 45; 60/639
See application file for complete search history.

(56) References Cited

U.S. PATENT DOCUMENTS

| | | | |
|---|---|---|---|
| 3,985,222 A * | 10/1976 | Kressly | 198/617 |
| 3,987,307 A * | 10/1976 | Giconi | 290/1 D |
| 4,363,212 A | 12/1982 | Everett | |
| 4,698,516 A | 10/1987 | Thompson | |
| 5,944,480 A | 8/1999 | Forrest | |
| 5,970,712 A * | 10/1999 | Stein | 60/639 |
| 6,249,057 B1 | 6/2001 | Lehet | |
| 7,750,253 B2 * | 7/2010 | Wineland | 177/16 |

* cited by examiner

Primary Examiner — Nicholas Ponomarenko
(74) Attorney, Agent, or Firm — Egbert Law Offices, PLLC

(57) ABSTRACT

A system and method for generating electrical energy from continental shelf mass involves moving continental shelf mass onto a conveyor at a first elevation at or near sea level. The mass is moved on the conveyor system to a second elevation well below sea level. Ideally, the second elevation is the bottom of a continental trench. The conveyor is then used to convey a liquid, preferably seawater, to a third elevation higher than the first elevation. The liquid is then passed into a reservoir and through a hydroelectric generator. The conveyor system may include a bucket chain enclosed in a pipeline.

19 Claims, 2 Drawing Sheets

ENERGY GENERATION USING CONTINENTAL SHELF MASS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to generating energy using continental shelf mass. More particularly, the present invention generates energy contained in solid mass that is delivered from a high elevation to a lower elevation. Additionally, energy generated from the kinetic energy of the solid mass is used to raise water to a higher elevation to use as the motive force for electric turbines. Alternatively, electric energy is generated from a direct connection to the movement of the delivery conveyor.

2. Description of Related Art Including Information Disclosed Under 37 CFR 1.97 and 37 CFR 1.98.

Energy is converted daily between various forms, usually from a natural resource into a quantity of usable energy. For instance, fossil fuel is converted into thermal or mechanical energy which powers automobiles and heats buildings, and hydrodynamic energy generates electricity which cools buildings and powers home appliances. Depending on the energy conversion process used, the efficiency with which energy is converted varies. Inevitably though, inefficiencies in energy conversion waste energy, and the wasted energy then returns to the environment. Forms of energy that have historically been wasted are being re-utilized, however, such as with the refinement of used petroleum products into heating fuel and lubricants.

Generation of electric power is a necessary component for the operation of modern society. Alternatives to conventional electric power generation sources fueled by coal or nuclear materials continue to be explored. One of the most inexpensive and cleanest methods for generating large amounts of electric power is hydroelectric power generation. The use of hydroelectric power generation, however, is limited because it requires the availability of vast quantities of water and the feasibility of constructing a large dam to store the large amount of water. Moreover, the geological sites where the requisite conditions for hydroelectric power generation can be satisfied are few and far between. These limitations often require reliance on other means of power generation such as nuclear and fossil fuel power plants, which are expensive and environmentally unattractive. Other sources of energy, such as wind and solar power, are environmentally clean and relatively inexpensive. However, a large-scale utilization of these sources for electric power generation is not currently in practice because of several limitations that are inherent in these methods. For example, wind power and solar energy both require a disproportionately large surface area for a large-scale operation. Further, these methods are unreliable because of their dependence on the weather conditions. Thus, it is difficult to obtain continuous generation of a large amount of electric power through wind power or solar energy.

Continental drift provides all the environmental benefits of hydroelectric energy, while providing substantially more useful electricity. The energy associated with the drift of a continent is ½*mass*velocity^2 from a given anchor point. The velocity of a continent is low, but the mass is extremely large. With a mass of a continent estimated around 10^22 lbs, with a velocity of 2.5 cm/year, the power available is 10^15 Kilowatts, or 10^10 the amount of energy required by the United States.

There are numerous possible ways to harness continental drift, including cables attached to a fixed reference point, spring compression and release, hydraulic lifting of water for use in turbines on release, or gas compression and release. However the preferred conditions use energy created by continental drift that has been accumulated over millions of years.

Historically, part of the energy from continental drift movement has raised mountains, and has accumulated millions of years of potential energy. Recovery of that potential energy is available by tearing down the mountains to harness the potential energy created by continental drift. Water can be used as the motive force for electric turbines or a direct mechanical connection to the delivery conveyer. Ideally, continental mass can be sent from a mountain to the bottom of a trench. Two examples of such locations where this would be ideal are (1) the sands of the Sahara Desert and (2) the mud volcanoes near the Mariana Trench. Energy could be harnessed from the motion of mass moving from the top of the mountain, down to the bottom of the trench. This method would utilize principles of continental drift, hydroelectric generation, and relative buoyancy.

Velocity enhancement can be used in conjunction with the energy provided by continental drift in order to increase the effective leverage provided by the moving continental shelf mass. The small movement of the continent and the preferred relatively high velocity of the cable driving a generator requires, in optimal conditions, velocity enhancement. Velocity enhancement can be provided through the use of a block and tackle arrangement or a geared reducer.

In the past, patents have been issued for water and buoyancy powered generation systems. For example, U.S. Pat. No. 4,363,212, issued to Everett on Dec. 14, 1982, discusses a buoyancy prime mover that converts the potential energy of a gas buoyant within a liquid into rotating mechanical energy. The buoyancy prime mover includes a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power.

U.S. Pat. No. 5,944,480, issued to Forrest on Aug. 31, 1999, discusses a motor that combines buoyant and gravitational forces to create a highly efficient limitless source of energy. The motor comprises a reservoir containing liquid; a vertical cylinder in communication with, extending from the liquid reservoir, containing liquid and having a top and a bottom; a continuous chain extending vertically through the fluid contained in the vertical cylinder, the chain including a plurality of floats spaced along and linked together by connecting cable, each float having an external cup that carries a small amount of liquid to the top of the cylinder and discharges the liquid back into the cylinder as the float exits same; an upper sprocket wheel around which the continuous chain travels and where the direction of the continuous chain changes from upward away from the top of the vertical cylinder to downward through ambient air; a lower sprocket wheel around which the continuous chain travels and where the direction of the continuous chain changes from downward to upward into the bottom of the vertical cylinder; an upper valve at the top of the vertical cylinder through which the float containing continuous chain passes; a lower valve disposed within the liquid reservoir at the bottom of the vertical cylinder through which the float containing continuous chain passes; an upper cam assembly actuated by the upper sprocket wheel for operating the upper valve; and, a lower cam assembly actuated by the lower sprocket wheel for operating the lower valve.

U.S. Pat. No. 6,249,057, issued to Lehet on Jun. 19, 2001, discusses an energy conversion apparatus for converting compressed gas to shaft power. The apparatus includes a housing divided between first and second chambers in fluid communication with each other and adapted to maintain a water column in the second chamber when the first chamber is pressurized with the compressed gas. The air filled first chamber houses a gravity drive system which harnesses energy created by the gravitational forces acting on a plurality of downwardly moving cylindrical containers grasped by receiving arms disposed on at least one gravity drive chain in the first chamber. The second chamber houses a buoyancy drive system which harnesses energy created by buoyant forces acting on a plurality of upwardly moving cylindrical containers grasped by receiving arms disposed on at least one buoyancy drive chain in the second chamber. An external drive shaft is driven by a coupling means which combines the energy created by the buoyancy and gravity drive systems.

U.S. Pat. No. 4,698,516, issued to Thompson on Oct. 6, 1987, discusses a hydro-electric power plant specifically structured to operate in connection with a water reservoir supplied from a natural body of water and which is structured to be at least partially self-sufficient while at the same time providing excess electrical energy in the operation of an auxiliary production facility such as an aluminum smelting plant.

It is an object of the present invention to provide energy from continental drift.

It is another object of the present invention to provide energy stored in mountains from continental drift.

It is another object of the present invention to provide energy while producing no emissions.

It is another object of the present invention to provide energy stored in mountains while depositing material into a trench.

It is a further object of the present invention to provide maximum energy from the mass stored within the mountains created by continental drift.

It is still another object of the present invention to provide velocity enhancement during the energy generation process.

It is still a further object of the present invention to provide energy stored from continental drift by utilizing water as the motive force.

These and other objects and advantages of the present invention will become apparent from a reading of the attached specification and appended claims.

BRIEF SUMMARY OF THE INVENTION

The present invention is a method of generating electrical energy including the steps of: (1) moving a mass onto a conveyor at a first elevation; (2) transporting the mass on the conveyor to a second elevation, the second elevation being lower than the first elevation; (3) lifting a liquid with the conveyor to a third elevation, the third elevation being above the first elevation; and (4) passing the liquid through a hydroelectric generator. The first elevation may be at or near sea level. The second elevation is below sea level and the third elevation is above sea level. Preferably, the third elevation is between 1000 and 5000 feet above sea level, and the second elevation is approximately 10,000 or more feet below sea level. The second elevation may preferably be a continental trench.

In the preferred method, the mass is in the form of a slurry and may be continental shelf mass. The third elevation may have a reservoir adjacent said hydroelectric generator. The liquid is preferably seawater. The conveyor is preferably contained within a pipeline.

The present invention is also a system for generating electrical energy using continental shelf mass. The system includes a hydroelectric power plant at a first elevation above sea level. A conveyor has one end adjacent the first elevation. The conveyor is provided for moving continental shelf mass from a second elevation adjacent sea level to a third elevation below sea level. The conveyor also moves sea water from sea level to the first elevation.

In the system of the present invention, the conveyor includes a first pipeline having a first opening at the first elevation, a second opening at the second elevation and a third opening at the third elevation. A second pipeline is positioned adjacent the first pipeline. The second pipeline has a first opening at the first elevation and a second opening at the third elevation. A plurality of connected containers are movably positioned within the first pipeline and second pipeline. In the system of the present invention each of the plurality of connected containers is preferably a cylindrical container with a top opening and a bottom opening. A first slide flapper valve is positioned over the top opening and a second slide flapper valve is positioned over the bottom opening.

The present invention is also a method for transporting water for use in hydroelectric generation. The method includes the steps of: (1) moving a mass from an elevation at or near sea level onto a conveyor; (2) transporting the mass downwardly on the conveyor to an elevation below sea level; and (3) lifting a volume of the water with the conveyor from an elevation at or below sea level to an elevation above sea level. In the method, the elevation below sea level is preferably a continental trench.

The foregoing Summary of the Invention is intended to generally summarize the preferred embodiment of the present invention. This section is not intended, in any way, to be limiting of the scope of the present invention. The scope of the present invention should only be limited by the following claims and their legal equivalents.

DETAILED DESCRIPTION OF THE INVENTION

Figure 1:
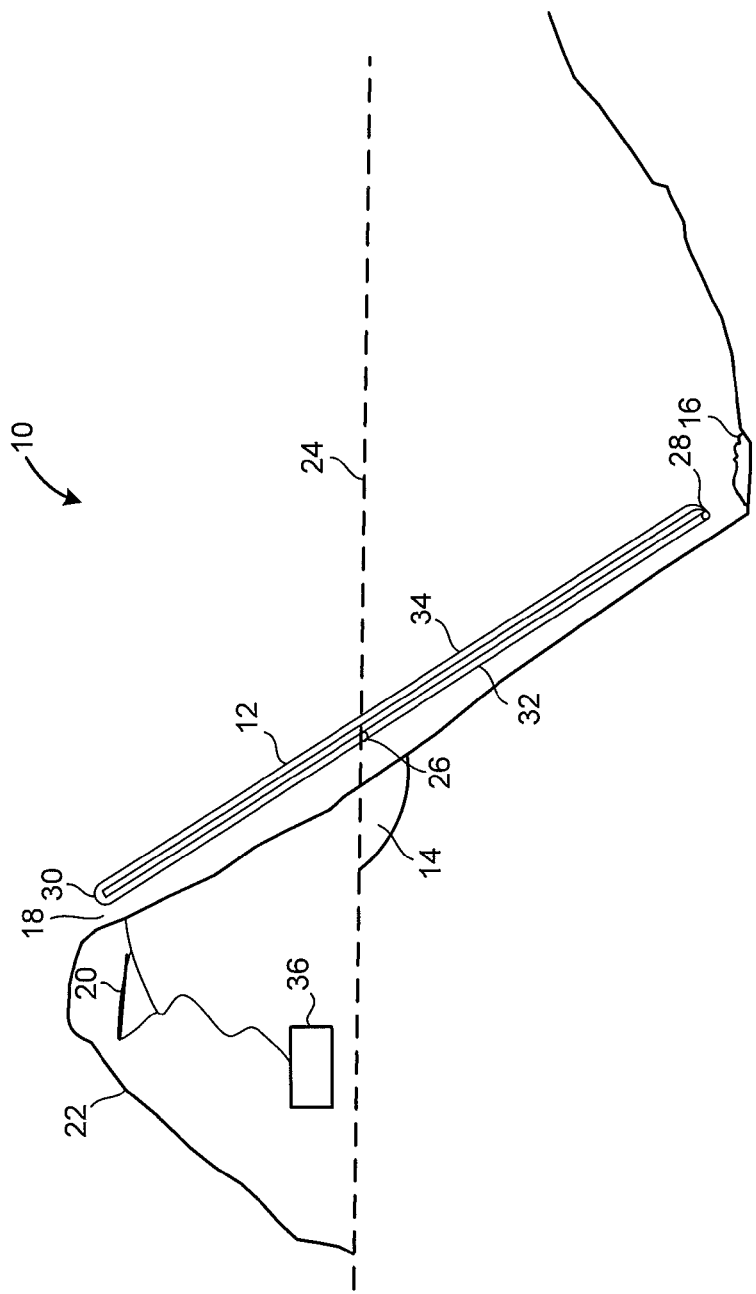
FIG. 1 is a schematic view showing the preferred embodiment of the system and method of the present invention.

Referring to FIG. 1, there is shown the energy generation system 10 in accordance with the preferred embodiment of the method and system of the present invention. The energy generation system 10 primarily includes a conveyor system 12. The conveyor system 12 serves two functions. First, the conveyor system 12 transports a mass from an elevation at or near sea level to an elevation well below sea level. Second, the conveyor system 12 transports water from an elevation at or below sea level to an elevation well above sea level.

The conveyor system 12 of the present invention is first loaded with a mass at first elevation 14. The first elevation 14 is at or very near sea level 24. Preferably, the material loaded at the first elevation is continental shelf mass at an elevation just below sea level. The mass loaded at first elevation 14 is transported downwardly via the conveyor system 12 to the second elevation 16, where it is deposited. The mechanism used to transport the mass downward to the second elevation 16 is then moved upwardly along the conveyor system 12. The conveyor system 12 then operates to move water from sea level 24 upwardly to the third elevation 18. At the third elevation 18, the water is preferably deposited into a reservoir 20. The reservoir 20 stores water to be passed through a hydroelectric power plant 36.

As shown in FIG. 1, the conveyor system 12 is preferably composed of a first pipeline 32 and a second pipeline 34. Railcars or buckets (preferably in the form of a bucket chain; shown in FIG. 2) are contained within the first pipeline 32 and second pipeline 34. The railcars or buckets are loaded with a mass through the opening 26 in the first pipeline 32 at the first elevation 14. The mass from the railcars or buckets is deposited through opening 28 in the first pipeline 32 at second elevation 16. After depositing the mass, the railcars or buckets move upwardly through the second pipeline 34. The railcars or buckets are then loaded with a liquid (preferably seawater) and transport the liquid to the third elevation 18. The liquid is deposited at the third elevation 18, preferably through a third opening 30, which may or may not be integrally formed with the first pipeline 32 or second pipeline 34. After depositing the liquid, the railcars or buckets then travel back downwardly to the first elevation 14 to be loaded again. While not preferred, mass may be loaded at the third elevation 18 if an adequate source is available.

In the present invention, preferably the energy generation system is located on a mountainous coastal region adjacent a continental trench. In this preferred case, the first elevation 14 would be at or near sea level, the second elevation 16 would be at the bottom of a continental trench and the third elevation 18 would be atop a mountain 22 adjacent the coast. In lieu of a mountain, when the difference in height between the first elevation 14 and third elevation 18 is less than 1000 feet, other support structures such as towers may be used.

The mass being transported to the bottom of the continental trench is preferably in the form of a slurry, wherein solid material (e.g. sand) acts in a fluid matter. There are numerous possible sources of the slurry material, including sand mined from directly below sea level.

Figure 2:
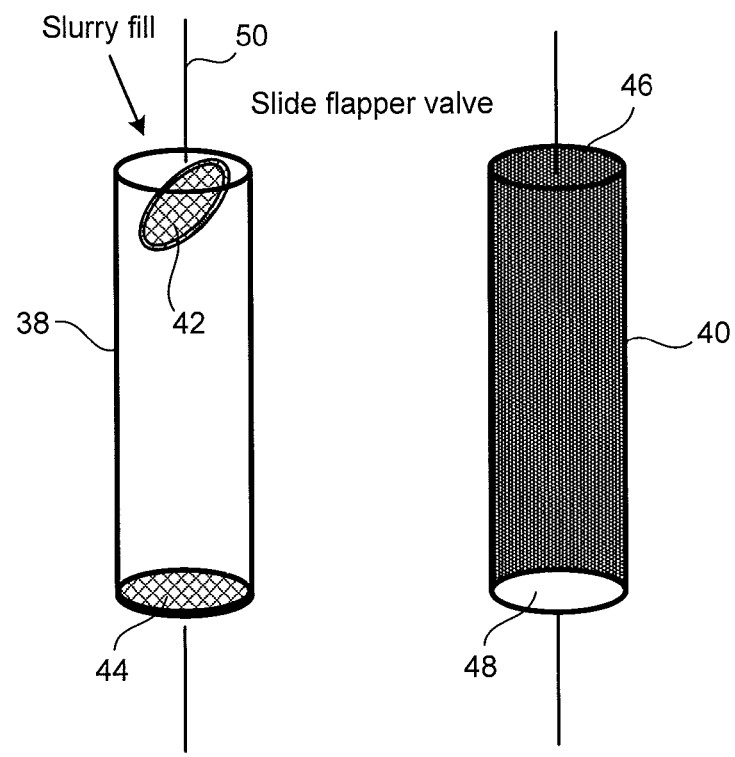
FIG. 2 is a schematic view showing the operation of the bucket chain of the present invention.

Referring to FIG. 2, there is shown a schematic view of two buckets 38 and 40 of the bucket chain of the conveyor system 12 of the present invention. The buckets 38 and 40 are preferably cylindrical, but may also be rectangular prisms similar to railroad cars or spherical. The first bucket 38 is used to demonstrate the bucket configuration when the bucket is moving downwardly from the third elevation 18. A chain 50 is shown extending from the top of the first bucket 38 and would be used to connect to adjacent buckets of the bucket chain. The bucket chain preferably comprises a loop of connected, adjacent buckets. Adjacent buckets may also be connected with tension rods or other suitable connection mechanisms. The first bucket 38 has a top slide flapper valve 42 and a bottom slide flapper valve 44. During decent of the first bucket 38, the top slide flapper valve 42 is in an open position and the bottom slide flapper valve 44 is in a closed position. This allows the mass or slurry to fill the first bucket 38 through the top slide flapper valve 42 and rest on the bottom slide flapper valve 44.

The second bucket 40 is used to demonstrate the bucket configuration when the bucket is moving upwardly from the second elevation 16. The second bucket 40 has a top slide flapper valve 46 and a bottom slide flapper valve 48. When the second bucket 40 is being raised, both the top slide flapper valve 46 and the bottom slide flapper valve 48 remain closed, such that seawater is enclosed therein.

When, for example, the first bucket 38 reaches the second elevation 16, both slide flapper valves 42 and 44 open to deposit the mass and collect seawater. After collecting seawater the bucket is returned to the configuration of second bucket 40. When the bucket containing seawater reaches the top of the bucket chain at third elevation 18, the top of the slide flapper valve then opens to deposit the seawater. The various valves on the bucket chain can be programmed to open and close at the proper times.

Table 1 below shows an example of the various forces at work when the first bucket 38 is full and moving downwardly and the second bucket 40 is moving upwardly while under water. The calculations assume: one cubic foot bucket filled with 60% sand (specific gravity of 2.5) and 40% water (specific gravity of 1.0), 62.4 pounds per cubic foot of water).

TABLE 1

|  | First Bucket (down) | Second Bucket (Up) |
|---|---|---|
| Weight of Sand | 93.6 lbs | n/a |
| Weight of Water | 24.96 lbs | 62.4 lbs |
| Total Weight | 118.56 lbs | 62.4 lbs |
| Buoyant force of container | −62.4 lbs | 62.4 lbs |
| Net | 56.16 down | 0.0 |

In the present invention, the gravity acting on the solids (mass, slurry) less buoyancy that provides the power necessary for the movement of the conveyor system 12. This net downward force, as shown in Table 1 above, is transmitted through the bucket chain causing a counter-clockwise rotation of the conveyor system 12, allowing the seawater to be deposited at the third elevation 18. Tension on the chain is maintained throughout. The power required to move the seawater to the third elevation 18 is obviously significant. However, by dropping sand (specific gravity of 2.5) approximately 10,000 feet, enough power should be generated to raise seawater (specific gravity of 1.03) a large fraction of that distance.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A method of generating electrical energy comprising:
   moving a mass onto a conveyor at a first elevation;
   transporting said mass on said conveyor to a second elevation, said second elevation being lower than said first elevation;
   lifting a liquid on with said conveyor to a third elevation, said third elevation being above said first elevation; and
   passing said liquid through a hydroelectric generator.

2. The method of claim 1, said first elevation being at or near sea level, said second elevation being below sea level, said third elevation being above sea level.

3. The method of claim 2, said third elevation being between 1000 and 5000 feet above sea level, said second elevation being approximately 10,000 or more feet below sea level.

4. The method of claim 1, said second elevation being a continental trench.

5. The method of claim 1, said mass being in the form of a slurry.

6. The method of claim 1, said third elevation having a reservoir adjacent said hydroelectric generator.

7. The method of claim 1, said liquid being sea water.

8. The method of claim 1, said conveyor being contained within a pipeline.

9. The method of claim 1, said mass being continental shelf mass.

10. A system for generating electrical energy using continental shelf mass, the system comprising:
    a hydroelectric power plant at a first elevation above sea level; and
    a conveying means having one end adjacent said first elevation, said conveying means for conveying continental shelf mass from a second elevation adjacent sea level to a third elevation below sea level, said conveying means further for conveying sea water from sea level to said first elevation.

11. The system of claim 10, said third elevation being a continental trench.

12. The system of claim 10, said continental shelf mass being in the form of a slurry.

13. The system of claim 10, further comprising:
    a reservoir adjacent said hydroelectric power plant, said conveying means suitable for depositing said seawater into said reservoir.

14. The system of claim 10, said conveying means comprising:
    a first pipeline having a first opening at said first elevation, a second opening at said second elevation and a third opening at said third elevation;
    a second pipeline positioned adjacent said first pipeline, said second pipeline having a first opening at said first elevation and a second opening at said third elevation; and
    a plurality of connected containers movably positioned within said first pipeline and second pipeline.

15. The system of claim 14, each of said plurality of connected containers comprising:
    a cylindrical container having a top opening and a bottom opening;
    a first slide flapper valve positioned over said top opening; and
    a second slide flapper valve positioned over said bottom opening.

16. A method for transporting water for use in hydroelectric generation, the method comprising:
    moving a mass from an elevation at or near sea level onto a conveyor;
    transporting said mass downwardly on said conveyor to an elevation below sea level; and
    lifting a volume of the water with said conveyor from an elevation at or below sea level to an elevation above sea level.

17. The method of claim 16, said elevation below sea level being a continental trench.

18. The method of claim 16, said mass being in the form of a slurry.

19. The method of claim 16, said mass being continental shelf mass.

* * * * *